Patented Oct. 5, 1937

2,094,727

UNITED STATES PATENT OFFICE 2,094,727

METHOD OF MAKING WEAR-RESISTING ANTISKID CHIPS

Oliver Stella, Chicago, Ill.

No Drawing. Application January 24, 1934, Serial No. 708,166

1 Claim. (Cl. 106—7.5)

My invention relates generally to the construction of roads, pavements, floors, and the like to be subjected to vehicle or pedestrian traffic, and an important object of my invention is to provide means whereby the wearing surfaces will have long life and even wearing qualities, and possess a high degree of non-skid quality, even when wet or damp.

It is also an important object of my invention to provide means of the character described above which is much cheaper than any other similar product, due to the low cost availability of the raw material used, and the comparative ease of manufacture and use thereof.

Other objects and advantages of my invention will be apparent from a reading of the following description and explanation wherein I set forth a preferred embodiment of the invention and a method of making the same.

The invention contemplates the increasing of the durability and even wearing qualities of the top surfaces of roads, pavements, floors, and other similar construction subjected to vehicular and pedestrian traffic, and the rendering of such surfaces extremely non-skid whether dry or wet, by the incorporation in such surfaces of artificial mineral product composed essentially of a cement and a metallic abrasive oxide, the particles ranging in size from 1/16 (one-sixteenth) of an inch in diameter to the size of the particles of sugar or salt granulated. The method of the invention contemplates the bringing together of the cement and metallic abrasive oxide in such a way that a strength of upwards of seventeen thousand (17,000) pounds per cubic inch is obtained in the final product, a strength which is much greater than the strength of any cement now available for similar purposes. This strength is greater than that possessed by the majority of marble chips and the like which are used in terrazzo, terrazzolite, or art marble. The chips or particles of the product of my invention may be made in any desired colors to match marble chips used for terrazzo, terrazzolite, or art marble, and in different shades simply by adding from one half pound to six pounds of dry mineral color to every one hundred (100) pounds of the cement used in manufacturing the product. Dry mineral colors are used. The dry mineral color is introduced when the cement and the abrasive oxide are brought together.

In applying or using the product of the invention, the particles may be mixed with the top surfacing material of the road, pavement, etc., or sprinkled over the top surface before the cement thereof has become hard or set and pressed into the surface with a trowel or roller. It is a characteristic of the material of the invention that as it is worn down the non-skid character thereof increases because of the increased friction offered by the worn down surfaces.

The product of the invention is composed of one part of cement, either dark or light (white) such as Portland cement, and from one to six parts of a metallic abrasive oxide, such as aluminum, iron, or grains of carborundum oxide or the like abrasive material. The size of the abrasive material may range from 1/16 (one sixteenth) of an inch in diameter to the size of the particles of granulated sugar or salt.

The method of assembling these ingredients is as follows:—

The cement and metallic oxide or other abrasive are placed into a suitable type of mixing machine in dry condition and mixed until thoroughly mixed and amalgamated.

When the amalgamation has taken place the resultant is removed from the mixing machine and put into another suitable mixing machine wherein water is added to the said resultant in an amount sufficient to bring the consistency of the material to that of bread dough.

Before the resultant of the above steps has set it is placed into an iron form or mold having a depth of not more than four inches and not less than two inches. The usual size of the form or mold will be one foot square, or two feet square, or two feet by three feet rectangular. These sizes of molds or forms are prepared because better results are obtained when using a press to eliminate the air holes in the product, thereby enabling it to be made extremely solid and dense. For example, for material from a mold or form of a size of two by three feet having a depth of four inches, a press of 650 tons capacity developing 650,000 pounds pressure per cubic foot or 376 pounds per cubic inch is used. A pressure of 650,000 pounds per cubic foot has been found adequate for removing all air pockets and to give the desired density.

After having been subjected to pressure the material is permitted to remain in its mold or form for a period of twelve (12) hours to become set, after which the resultant block or slab is removed to an air-tight room for curing and permitted to set therein slowly for a period of from 10 to 12 days.

During the said period of from 10 to 12 days the blocks or slabs are covered with damp rags, moistened daily, in order to keep the moisture in at all times. The curing in the air-tight room is done so that the blocks or slabs will be kept continually moist and continually absorbing moisture slowly during the 10 to 12 days period, a treatment which results in much greater strength than could be derived by curing in an exposed or open room.

After the termination of the said 10 to 12 days period the blocks or slabs are removed to a dry place and permitted to age for a period of thirty days or more. It has been found that the cement of which the block is made sometimes requires at least twenty-seven (27) days in which to complete "working" before reaching final setting. The weather conditions prevailing at the place of manufacture will also dictate shortening or lengthening this thirty days period.

At the termination of the said thirty day period the blocks or slabs are chopped and broken into pieces which are put through a crushing machine to be crushed to the size of marble chips such as used for terrazzo, terrazzolite, or art marble. The sizes of these chips range from No. 0 to Nos. 1, 2, 3, 4, or any sizes which will pass through a mesh having a one-eighth (⅛) of an inch aperture to a three-quarters (¾) of an inch aperture. Using a large size chip in treating a surface therewith will impart greater strength to the surface, as will be obvious.

Although I have shown and described herein a preferred embodiment of my invention, it is to be definitely understood that I do not desire to limit the application of the invention thereto, and any change or changes may be made in materials and ingredients, and in the manner of assembling the same, within the spirit of the invention and the scope of the subjoined claim.

What is claimed is:—

The method of making wear-resisting anti-skid chips without the use of heat for incorporation in floor surfaces and the like, which comprises, preparing a cold plastic of Portland cement, water and a metal oxide selected from the group consisting of aluminum oxide, iron oxide and carborundum, subjecting said plastic to a high pressure of substantially not less than 650,000 pounds per cubic foot to form a solid block of high density, curing and seasoning the block, and crushing the block into chips.

OLIVER STELLA.